June 7, 1960 M. E. HOFFMAN 2,939,239
FISH NET
Filed May 27, 1957 2 Sheets-Sheet 1
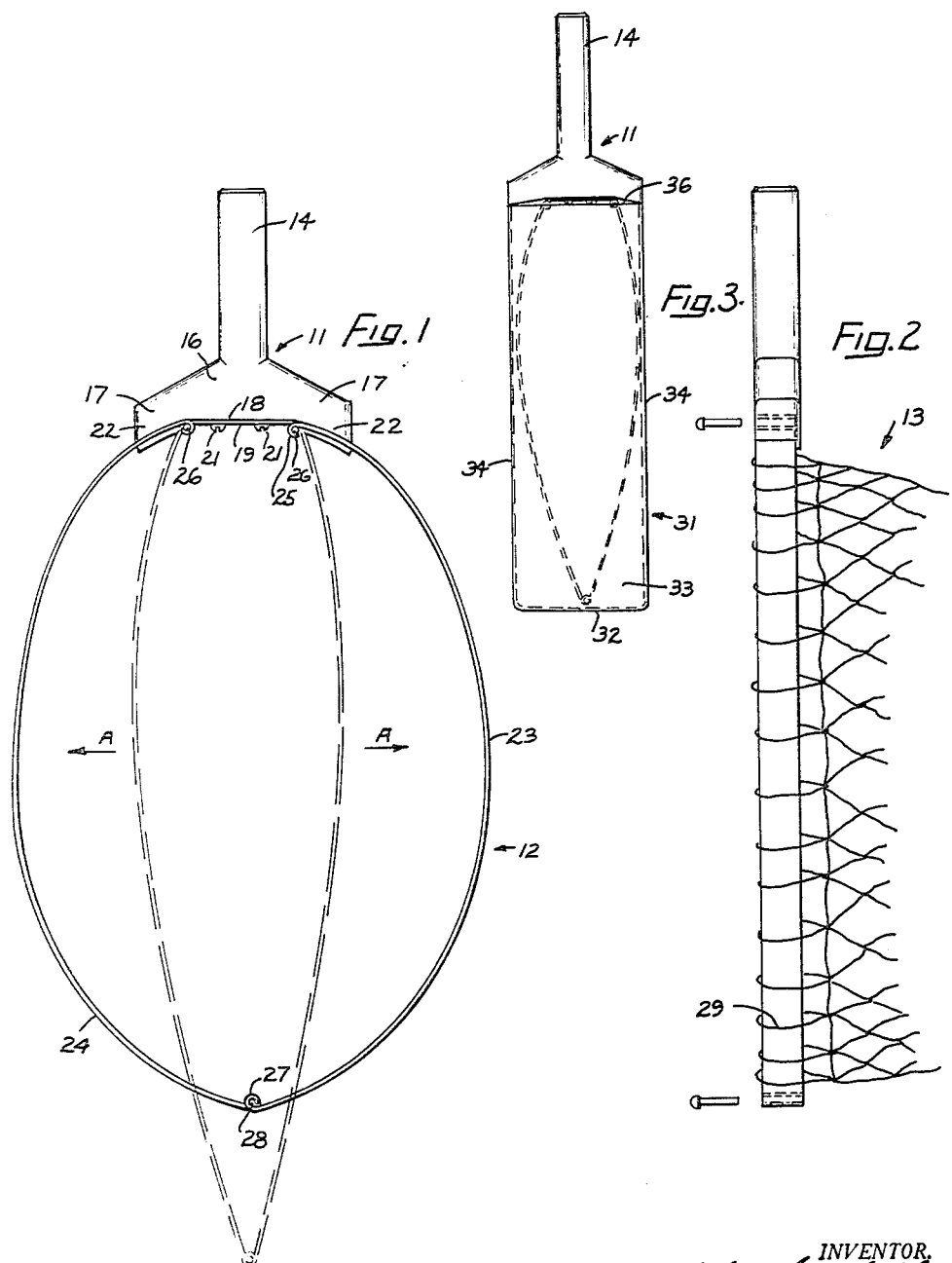
INVENTOR.
Marsh E. Hoffman
BY June 7, 1960
M. E. HOFFMAN
2,939,239
FISH NET
Filed May 27, 1957
2 Sheets-Sheet 2
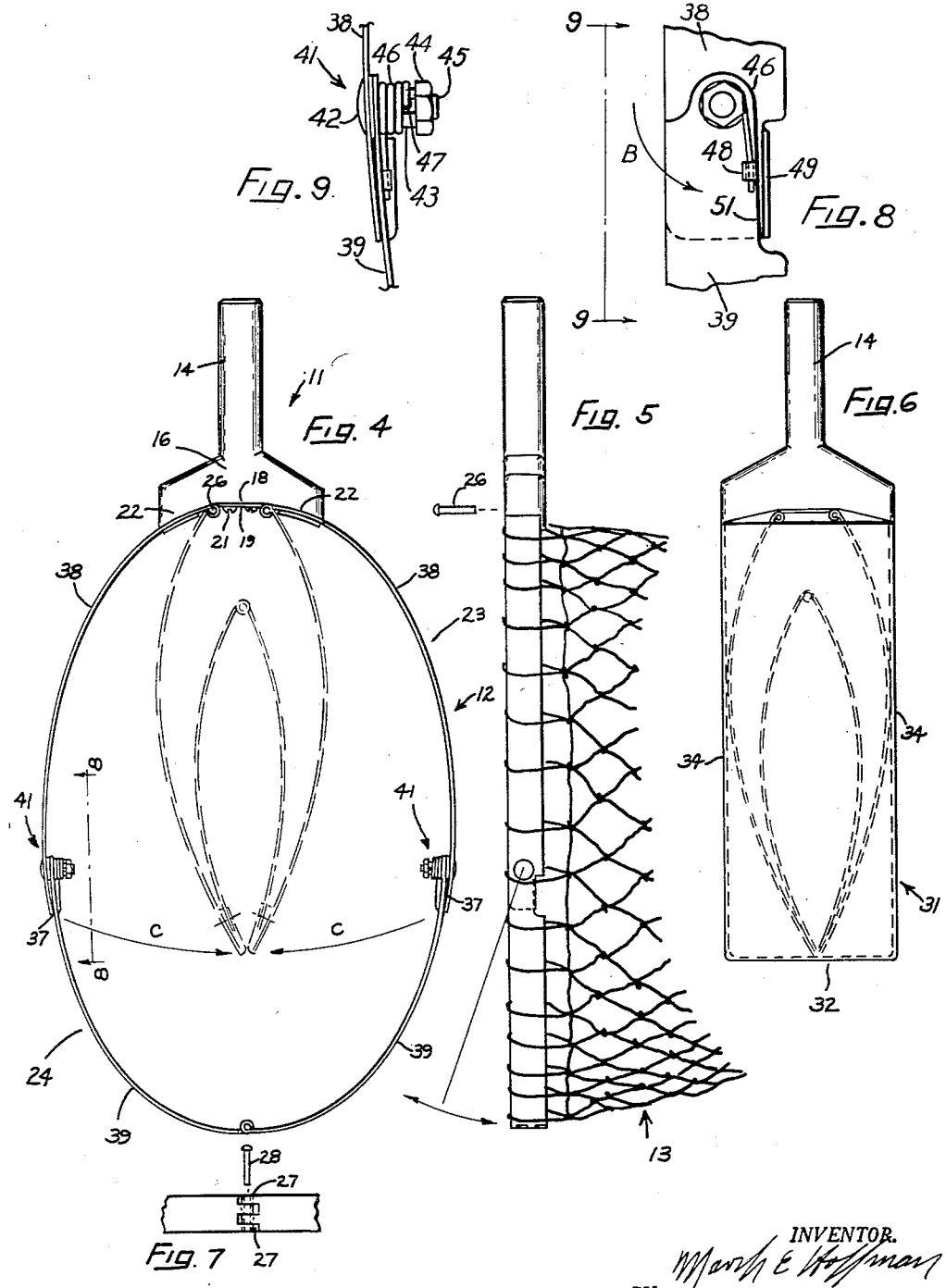
INVENTOR.
Marvin E. Hoffman
BY

United States Patent Office 2,939,239
Patented June 7, 1960

2,939,239

FISH NET

Marsh Enke Hoffman, Gearhart, Oreg.

Filed May 27, 1957, Ser. No. 661,895

4 Claims. (Cl. 43—12)

My invention relates to a fish net and more particularly to the supporting structure for a fish net which may be collapsed from its normal expanded useful condition to a compact assembly to enable the fish net to be conveniently carried in a scabbard of relatively small size.

An object of my invention is to provide a fish net and a supporting structure therefor which is of simple construction, inexpensive to manufacture, and which may be conveniently collapsed for storage.

Another object of my invention is to provide a fish net and carrier or support therefor which may be easily and quickly withdrawn from a scabbard or other holder; quickly placed in a condition for netting fish; and readily collapsed when not in use so that it may be held within the confines of a relatively small scabbard adapted to be slung from the belt of the user or adapted to be mounted in a convenient out of the way position on a fishing boat.

My invention further contemplates a collapsible frame or carrier for a fish net in which the frame or carrier is made of spring metal, the spring elements of the carrier being biased in a direction such that the net is normally in the open widemouthed position and in the condition required for netting fish but in which the spring elements of the carrier may be collapsed so that the net may be placed in a scabbard of relatively small dimensions to enable the net to be conveniently slung from the belt of the user or stored on a fishing boat in a minimum of space.

Other objects and advantages of this invention will be particularly set forth in the claims and will be apparent from the following description, when taken in connection with the accompanying drawings, in which:

Fig. 1 is a top plan view of the supporting frame of the net carrier together with its handle, the net being omitted and the dotted line position of the parts indicating how the supporting frame or carrier may be collapsed;

Fig. 2 is a side elevation of Fig. 1 except that the net threaded on the supporting frame has been partially shown in this view;

Fig. 3 is a view of the dotted line position of the carrier or net supporting frame showing the dotted line position of the parts (Fig. 1) on a somewhat smaller scale and indicating how the supporting frame may be confined in a scabbard;

Fig. 4 is a view similar to Fig. 1 showing another form of the invention designed for more complete collapsing of the net carrier so as to make the device more adaptable to being carried conveniently by a fisherman in a scabbard hung from the fisherman's belt;

Fig. 5 is a side elevation of Fig. 4 with the net partially shown;

Fig. 6 is a view showing the carrier mounted in a scabbard the net being omitted;

Fig. 7 is a view showing the pivotal construction between sections of the net carrier;

Fig. 8 is a view of the hinge construction between carrier parts and taken in the direction of the arrows 8—8 of Fig. 4; and Fig. 9 is a top plan view of Fig. 8 taken in the direction of the arrows 9—9 of Fig. 8.

The fish net assembly of my invention comprises a handle generally indicated by the numeral 11; a fish net carrier or support generally indicated by the numeral 12; and a fish net generally indicated by the numeral 13.

A handle 11 which may be of wood or other suitable material, comprises a hand grip 14 and an enlarged part 16 which has arms 17. The outer face of the enlarged part 16 has a flat surface 18 for reception of a support plate 19 attached to the flat surface by screws 21 or any other suitable means. Portions of the outer faces of the arms 17 on opposite sides of the support plate are curved on the arc of a circle, as indicated at 22, for a purpose which will later appear.

The fish net support or carrier 12 is in this first form of the invention in two parts 23 and 24. Each of the carrier parts 23 and 24 is thin in cross section and is of spring stainless steel or other non-corrosive spring metal. The carrier parts 23 and 24 are connected to the support plate 19 by means of pivot pins 26 which extend through cooperating, registering eyelets 25 formed on the ends of the carriers 23 and 24 and on the ends of the support plate 19. The free ends of the carrier parts 23 and 24 are provided with cooperating, registering eyelets 27 through which a hinge pin 28 extends (see Fig. 7).

The carriers 23 and 24, as previously mentioned, are of spring metal, preferably non-corrosive steel, the springs being biased so that normally the carrier forms an enlarged open-mouthed loop as indicated in solid lines in Fig. 1. The direction of the spring forces is indicated by the arrows "A." When the carrier parts are in the solid line position of Fig. 1, parts of the carriers 23 and 24 engage the curved surfaces 22 of the arms 17. The curved parts 22 act as stops and limit the extent of movement of the carrier parts in the direction of the arrows "A." The curved parts thus define the extent of the loop or, in other words, the shape of the mouth opening. In the form of the invention shown in Fig. 1, the curvature of the surfaces 22 is such that the carrier 12 assumes a position defining substantially an ellipse.

The net 13 may be of any suitable material and construction is closed at its bottom (not shown) and is provided with loops 29 adapted to extend over the carrier parts 23 and 24. Upon removal of the hinge pin 28, the loops 29 of the net 13 may be threaded on or off the carrier parts 23 and 24.

The embodiment of the invention of Figs. 1–3, is primarily intended for the netting of rather large fish, for example, salmon. Figs. 1–3, inclusive, and Figs. 4–9, inclusive, are not to the same scale. The construction shown in Figs. 1–3, inclusive, is intended to be a much larger fish net having a much larger mouth opening than that of the second embodiment of the invention.

In Fig. 3 there is shown a scabbard, generally indicated by the numeral 31, which may be of leather or other suitable material. The scabbard has a bottom wall 32, front and rear walls 33 and end walls 34. The spacing of the front and rear walls from each other is sufficient to accommodate the carrier plus some extra space for the reception of the net. The upper end of the scabbard, as indicated at 36, is open and the scabbard is preferably provided with means (not shown) to enable it to be hung in a convenient position on a fishing boat.

When the fish net is conditioned for use, the parts occupy the positions shown in Fig. 1 in solid lines. In this position the mouth of the carrier is fully open for the netting of fish. When the carrier 12 is collapsed, it occupies the position shown in dotted lines in Fig. 1. However, this position of the parts is attained during the act of inserting the carrier, together with the depending net, into the scabbard. When the end of the carrier defined by the pivot pin 28 is inserted into the scabbard, the interior sidewalls 34 of the scabbard exert a confining action on the carrier as the carrier is moved into the scabbard. That is, the carrier parts 23 and 24 swing with respect to each other about the pivot pin 28 and swing about the pivot pins 26. Simultaneously by reason of the confining action of the scabbard, the spring force of the carrier parts 23 and 24 is overcome so that the carrier may be easily moved into the position shown in Fig. 3 in dotted lines. When the carrier, together with the fish net 13, are in position in the scabbard, the spring force exerted by the carrier parts 23 and 24 exert sufficient pressure on the interior sidewalls 34 of the carrier to retain the fish net in the scabbard against accidental displacement. Notwithstanding, by merely grasping the handle 14 and withdrawing the fish net from the scabbard, the spring of the metal of the carrier parts 23 and 24, together with the stops 22 and the hinge pins 26 and 28, cause an automatic opening of the fish net so that the parts assume automatically the position shown in Fig. 1.

The embodiment of the invention shown in Figs. 4–9, inclusive, is primarily intended for use by a fisherman fishing from a small boat or for use in stream fishing. The scabbard 31 is primarily designed and the fish net and carrier are designed so as to enable the scabbard to be hung from the belt of the user. Many of the parts of this embodiment are common to the embodiment shown in Figs. 1–3, inclusive, and these common parts have been correspondingly numbered so that further description of them is unnecessary.

In this embodiment the carrier parts 23 and 24 have been split at 37 so that actually four carrier parts are provided, two inner carrier parts, indicated by the numeral 38, and two outer carrier parts, indicated by the numeral 39. The carrier parts 38 and 39 are connected together by means of hinge assemblies, generally indicated by the numeral 41.

Each of the hinge assemblies 41 comprises a head 42 which has a stem or shank 43 which extends through the carrier part 38, as indicated at 45. A nut 44 threaded on the stem holds the parts in position. A spring 46 is wound around the hinge assembly and has one of its ends inserted in an opening in the stem as indicated at 47. The other end of the spring, as shown most clearly in Fig. 8, is confined by a lug 48 mounted on the carrier part 39. The carrier part 38 has a ledge 49 which serves in cooperation with the lower edge 51 of the carrier part 39 as a stop to limit movement of the carrier parts 39 in the direction of the spring force, indicated by the arrow "B" in Fig. 8.

When the fish net is to be placed in the scabbard of Fig. 6, the carrier or net supports 39 are first swung upward from their position shown in Fig. 5 or in a direction opposite to that indicated by the arrow "B" of Fig. 8 until carrier sections 39 lie within the confines of the carrier sections 38. Thereupon, upon applying a manual force in the direction indicated by the arrows "C" (Fig. 4), the parts may be shifted to the dotted line position shown in Fig. 4. When the parts are in the dotted line position, the carrier, together with its net, may be inserted in the scabbard 31. When it is desired to use the fish net, it may be removed from the scabbard and upon removal the carrier parts 38 will move apart to the position shown in Fig. 4 and the springs 46 will shift the carrier parts 39 about their pivots 41 to the position shown in solid lines in Figs. 4 and 5.

While I have shown and described the preferred forms of mechanisms of my invention, it will be apparent that various changes and modifications may be made therein, particularly in the form and relation of parts, without departing from the spirit of my invention as set forth in the appended claims.

I claim:
1. A fish net comprising, in combination, a pair of carriers, a handle provided with pivot means to which said carriers are pivoted, a pivot between said carriers at the ends thereof remote from said handle, means normally forcing said carriers to a position such that they form a large loop to enable the carrying out of fish netting operations and means including said pivot means for enabling collapse of said carriers from said large loop position to enable the placement of said carrier in a scabbard, said handle having a curved portion located toward the outside of the handle from each of said pivots for limiting the movement of said carrier in the direction of defining said enlarged loop.

2. A fish net comprising, in combination, elements defining a pair of sets of carriers, each of said elements having a curvature when the carriers are assembled, each of said sets of carriers comprising an innermost carrier part adjacent the handle and an outermost carrier part, a handle to which the inner carrier part is pivotally connected, a pivot between the elements of said outermost carrier part joining the carriers to define a continuous enlarged loop for performing netting operations, said elements being of spring metal biased in a direction when assembled to form said enlarged loop, a horizontally extending pivot between the elements of each set of carriers, a spring between the elements of each set normally urging the outermost carrier part when the fish net is to be used in a swinging movement out of the plane of the innermost carrier part around the horizontal pivots between the parts of the sets of carriers through 180 degrees into the plane of the innermost carrier part and stop means for limiting said swinging movement.

3. A fish net in accordance with claim 2 in which the outer carrier part is swung through 180 degrees so as to be substantially enclosed by the inner carrier part, whereby a rounded exterior wall is presented by the elements of the innermost carrier part so that when the carrier is placed in a scabbard the resilience of the elements of the innermost carrier part tends to hold the carrier in the scabbard with the elements of the innermost carrier part intermediate their ends bearing against the inner wall of the scabbard.

4. A fish net comprising, in combination, a pair of sets of carriers, a handle to which said sets of carriers are pivotally connected, each of said sets of carriers comprising an innermost carrier part adjacent the handle and an outermost carrier part, a pivot between said sets of carriers remote from the handle joining the carriers to define a continuous enlarged loop for performing netting operations, said carriers being of spring metal biased in a direction when assembled such as to form said enlarged loop, additional pivot means between the carrier parts of each set, a spring between the carrier parts of each set normally urging the outermost carrier away from the innermost carrier, said pivot means between the carrier parts of each set and said springs being disposed on the inside of said loop to facilitate entry and removal of the net from a scabbard, and a stop for limiting the movement of the outermost carrier so that it lies in a common plane with the innermost carrier, the pivots between the carrier parts of each set extending parallel to the plane of the carriers when open.

References Cited in the file of this patent
UNITED STATES PATENTS

| | | |
|---|---|---|
| 443,138 | Goepel | Dec. 23, 1890 |
| 525,619 | Pearsons | Sept. 4, 1894 |
| 649,581 | Landmann | May 15, 1900 |
| 1,524,957 | Sundberg | Feb. 3, 1925 |
| 2,579,748 | Matthews | Dec. 25, 1951 |

FOREIGN PATENTS

| | | |
|---|---|---|
| 527,372 | Canada | July 10, 1956 |